United States Patent [19]
Masberg et al.

[11] Patent Number: 6,158,405
[45] Date of Patent: Dec. 12, 2000

[54] SYSTEM FOR ACTIVELY REDUCING ROTATIONAL NONUNIFORMITY OF A SHAFT, IN PARTICULAR, THE DRIVE SHAFT OF AN INTERNAL COMBUSTION ENGINE, AND METHOD OF OPERATING THE SYSTEM

[75] Inventors: Ullrich Masberg, Rösrath/Kleineichen; Thomas Pels, Overath; Klaus-Peter Zeyen, Köln; Andreas Gründl, München; Bernhard Hoffmann, Starnberg, all of Germany

[73] Assignees: ISAD Electronic Systems, Cologne; Grundl and Hoffmann GmbH, Starnberg, both of Germany

[21] Appl. No.: 09/032,655

[22] Filed: Feb. 27, 1998

Related U.S. Application Data

[63] Continuation of application No. PCT/DE96/01613, Aug. 31, 1996.

[30] Foreign Application Priority Data

Aug. 31, 1995 [DE] Germany .............. 195 32 163

[51] Int. Cl.[7] .................... F02B 75/06
[52] U.S. Cl. .......................... 123/192.1
[58] Field of Search .............. 123/192.1, 192.2, 123/198 F, 481, 179.25

[56] References Cited

U.S. PATENT DOCUMENTS

| | | | |
|---|---|---|---|
| 2,654,849 | 10/1953 | Trofimov | 310/99 |
| 2,790,917 | 4/1957 | Trofimov | 310/102 |
| 3,609,420 | 9/1971 | Inagaki et al. | 310/54 |
| 3,774,303 | 11/1973 | Burkett et al. | 30/382 |
| 3,870,116 | 3/1975 | Seliber | 180/54 R |
| 3,902,073 | 8/1975 | Lafuze | 290/46 |
| 3,974,396 | 8/1976 | Schönball | 290/54 |
| 4,025,860 | 5/1977 | Shibata et al. | 320/3 |

(List continued on next page.)

FOREIGN PATENT DOCUMENTS

| | | |
|---|---|---|
| 58401-73 | 1/1975 | Australia . |
| 58401-73 | 1/1997 | Australia . |
| 0 151 935 A1 | 8/1985 | European Pat. Off. . |
| 0 175 952 A2 | 4/1986 | European Pat. Off. . |

(List continued on next page.)

OTHER PUBLICATIONS

F. Simovert, "Spannungszwischenkreis–Umrichter Baureihe 6SC44 . . . der Fa. Siemens AG", 1985, No. A 19100–E319–A262.

D. Teodorescu, "Kleinantriebe mit Vollpolläufer–Synchronmotoren", ema, May 1993, pp 39–43.

"Kraftfahrzeugtechnik" Nov. 1982, pp 346–347.

Litton prospect "Bürstenloser Hohlwellen–Resolver SSBH–15", Unterföhring.

(List continued on next page.)

*Primary Examiner*—Noah P. Kamen
*Attorney, Agent, or Firm*—Blakely, Sokoloff, Taylor & Zafman LLP

[57] ABSTRACT

The invention concerns a system for actively reducing rotational nonuniformity of oa shaft, in particular the drive shaft (10) of an internal combustion engine (1) or a shaft which is coupled, or can be coupled, to the drive shaft. The system includes at least one electrical machine (4), in particular an induction machine or traveling wave machine, which is coupled, or can be coupled, to the shaft; at least one invertor (17) which generates the voltage and/nor current of variable frequency, amplitude and/or phase necessary to produce the magnetic field of the electrical machine (4); and at least one control device (31) which controls the invertor (17) and hence the electrical machine (4) in such a way that the machine counteracts both positive and negative rotational nonuniformity of the shaft. The invention also concerns a method of actively reducing rotational nonuniformity using the system.

34 Claims, 5 Drawing Sheets

U.S. PATENT DOCUMENTS

| | | | |
|---|---|---|---|
| 4,066,936 | 1/1978 | Hirota | 318/139 |
| 4,346,773 | 8/1982 | Hofbauer et al. | 180/165 |
| 4,699,097 | 10/1987 | Tanaka et al. | 123/192 R |
| 4,797,602 | 1/1989 | West | 322/10 |
| 4,803,376 | 2/1989 | N'Guyen | 290/22 |
| 4,825,139 | 4/1989 | Hamelin et al. | 322/90 |
| 4,883,973 | 11/1989 | Lakey et al. | 290/31 |
| 4,922,869 | 5/1990 | Kadomukai et al. | 123/192 R |
| 4,942,950 | 7/1990 | Watanabe et al. | 192/0.096 |
| 4,958,095 | 9/1990 | Uchida et al. | 310/59 |
| 4,982,707 | 1/1991 | Maeda et al. | 123/192 B |
| 5,020,491 | 6/1991 | Mashino | 123/192 R |
| 5,033,425 | 7/1991 | Kadomukai et al. | 123/192 R |
| 5,053,632 | 10/1991 | Suzuki et al. | 290/45 |
| 5,087,869 | 2/1992 | Kuriyama et al. | 322/15 |
| 5,105,776 | 4/1992 | Tsuchiya et al. | 123/192.1 |
| 5,109,815 | 5/1992 | Maeda et al. | 123/192.1 |
| 5,125,236 | 6/1992 | Clancey et al. | 62/115 |
| 5,126,641 | 6/1992 | Putman et al. | 318/128 |
| 5,175,439 | 12/1992 | Härer et al. | 307/10.1 |
| 5,303,794 | 4/1994 | Hrovat et al. | 180/197 |
| 5,323,743 | 6/1994 | Kristiansson | 123/179.3 |
| 5,325,042 | 6/1994 | Murugan | 322/10 |
| 5,359,308 | 10/1994 | Sun et al. | 335/216 |
| 5,431,241 | 7/1995 | May et al. | 180/197 |
| 5,497,741 | 3/1996 | Tashiro et al. | 123/192.1 |

FOREIGN PATENT DOCUMENTS

| | | | |
|---|---|---|---|
| 0 233 738 A1 | 8/1987 | European Pat. Off. | |
| 0 388 485 A2 | 10/1989 | European Pat. Off. | |
| 0 354 790 A2 | 3/1990 | European Pat. Off. | |
| 0 385 311 A2 | 9/1990 | European Pat. Off. | |
| 0 427 568 A1 | 5/1991 | European Pat. Off. | |
| 0 437 266 A2 | 7/1991 | European Pat. Off. | |
| 0 440 088 A1 | 8/1991 | European Pat. Off. | |
| 0 530 659 A1 | 3/1993 | European Pat. Off. | |
| 0 557 522 A1 | 9/1993 | European Pat. Off. | |
| 0 569 347 A2 | 11/1993 | European Pat. Off. | |
| 0 604 979 A2 | 7/1994 | European Pat. Off. | |
| 0 612 928 A1 | 8/1994 | European Pat. Off. | |
| 2481656 | 11/1981 | France. | |
| 2563280 | 10/1985 | France. | |
| 282671 | 8/1912 | Germany. | |
| 874713 | 6/1952 | Germany. | |
| 893299 | 1/1953 | Germany. | |
| 904 737 | 6/1953 | Germany. | |
| 938680 | 6/1954 | Germany. | |
| 1 077 072 | 3/1960 | Germany. | |
| 1 156 319 | 10/1963 | Germany. | |
| 1 165 422 | 3/1964 | Germany. | |
| 1 284 853 | 12/1968 | Germany. | |
| 23 45 018 A1 | 4/1974 | Germany. | |
| 23 53 724 B2 | 5/1974 | Germany. | |
| 27 04 533 A1 | 8/1978 | Germany. | |
| 28 55 886 A1 | 6/1979 | Germany. | |
| 29 02 376 C2 | 7/1979 | Germany. | |
| 28 23 225 A1 | 11/1979 | Germany. | |
| 29 17 139 A1 | 11/1980 | Germany. | |
| 29 43 563 A1 | 5/1981 | Germany. | |
| 30 09 503 A1 | 9/1981 | Germany. | |
| 30 13 424 A1 | 10/1981 | Germany. | |
| 30 48 972 C2 | 7/1982 | Germany. | |
| 30 50 269 A1 | 10/1982 | Germany. | |
| 32 30 121 A1 | 2/1984 | Germany. | |
| 32 30 607 A1 | 2/1984 | Germany. | |
| 32 43 513 A1 | 5/1984 | Germany. | |
| 33 43 018 C2 | 6/1984 | Germany. | |
| 32 43 514 C2 | 9/1984 | Germany. | |
| 33 35 923 A1 | 9/1984 | Germany. | |
| 33 38 548 A1 | 5/1985 | Germany. | |
| 35 37 994 A1 | 5/1986 | Germany. | |
| 37 37 192 A1 | 7/1988 | Germany. | |
| 38 14 484 A1 | 11/1988 | Germany. | |
| 37 43 289 A1 | 6/1989 | Germany. | |
| 37 43 317 C3 | 6/1989 | Germany. | |
| 38 12 296 A1 | 11/1989 | Germany. | |
| 39 37 082 A1 | 5/1990 | Germany. | |
| 39 26 054 A1 | 2/1991 | Germany. | |
| 40 27 664 A1 | 3/1991 | Germany. | |
| 39 39 695 C1 | 5/1991 | Germany. | |
| 40 38 301 A1 | 6/1991 | Germany. | |
| 40 00 678 A1 | 7/1991 | Germany. | |
| 41 00 937 A1 | 8/1991 | Germany. | |
| 40 11 291 A1 | 10/1991 | Germany. | |
| 41 34 268 A1 | 4/1992 | Germany. | |
| 42 13 132 A1 | 11/1992 | Germany. | |
| 41 24 496 A1 | 1/1993 | Germany. | |
| 42 02 083 A1 | 7/1993 | Germany. | |
| 42 02 737 A1 | 8/1993 | Germany. | |
| 42 30 510 C1 | 9/1993 | Germany. | |
| 42 25 683 A1 | 2/1994 | Germany. | |
| 43 30 193 A1 | 3/1994 | Germany. | |
| 43 18 949 C1 | 6/1994 | Germany. | |
| 43 39 252 A1 | 6/1994 | Germany. | |
| 43 91 898 C2 | 6/1994 | Germany. | |
| 43 44 053 A1 | 7/1994 | Germany. | |
| 43 11 697 A1 | 10/1994 | Germany. | |
| 43 14 290 A1 | 11/1994 | Germany. | |
| 43 23 601 A1 | 1/1995 | Germany. | |
| 43 23 602 A1 | 1/1995 | Germany. | |
| 44 04 791 C1 | 3/1995 | Germany. | |
| 295 02 906 U1 | 4/1995 | Germany. | |
| 44 02 152 C1 | 4/1995 | Germany. | |
| 44 37 322 A1 | 5/1995 | Germany. | |
| 44 21 512 C1 | 6/1995 | Germany. | |
| 44 08 719 C1 | 7/1995 | Germany. | |
| 44 23 577 A1 | 8/1995 | Germany. | |
| 44 12 945 A1 | 10/1995 | Germany. | |
| 44 12 438 C1 | 11/1995 | Germany. | |
| 55-005454 | 1/1980 | Japan. | |
| 58-126434 | 7/1983 | Japan. | |
| 58-126434A | 7/1983 | Japan | 123/192.1 |
| 59-184020 | 10/1984 | Japan. | |
| 61-61923A | 3/1986 | Japan | 123/192.1 |
| 61-61926A | 3/1986 | Japan | 123/192.1 |
| 61-61927A | 3/1986 | Japan | 123/192.1 |
| 61-66819A | 4/1986 | Japan | 123/192.1 |
| 61-066820 | 8/1986 | Japan. | |
| 61-200333 | 9/1986 | Japan. | |
| 62-166749 | 7/1987 | Japan. | |
| 1113571 | 5/1989 | Japan. | |
| 1190922 | 8/1989 | Japan. | |
| 4024156 | 1/1992 | Japan. | |
| 05211258 | 8/1993 | Japan. | |
| 07105943 | 4/1995 | Japan. | |
| 20 42 772 | 9/1980 | United Kingdom. | |
| WO 88/08636 | 11/1988 | WIPO. | |
| WO 91/16538 | 10/1991 | WIPO. | |
| WO 94/19856 | 9/1994 | WIPO. | |
| WO 95/02758 | 1/1995 | WIPO. | |
| WO 95/24072 | 9/1995 | WIPO. | |

OTHER PUBLICATIONS

J. Reinert et al., "Digital Control and Optimization of a Rolling Rotor Switched Reluctance Maching", IEEE Transactions on Industry Appliations, Vo. 31, No. 2, Mar./Apr. 1995, p 338–344.

G. und H. Häberle, "Elektrische Maschinen in Anlagen der Energietechnik", Verlag Europa–Lehrmittel, Haan–Gruiten, 3. Auflage, 1994, Seiten 169–172.

G. Henneberger, "Elektrische Motoraustrüstung", Braunschweig, 1990, pp. 98–103.

J. Langheim, J. Fetz: "Electric Citybus with two Induction Motors—Power Electronics and Motor Control", ETEP, vol. 2, No. 6, Nov./Dec. 1992, pp 359–365.

Robert Bosch GmbH, "Kraftfahrtechnisches Taschenbuch", VDI–Verlag, Düsseldorf, 21 ed. 1991, pp. 346–347; 361; 555–559; 763–767.

H. Deisenroth, C. Trabert: "Vermeidung von Überspannungen bei pulsumrichterantrieben" etz, vol. 114, 1993, No. 17, pp. 1060–1067.

W. Geissler, F. Unger–Weber: "Modelling the Three–Phase Propulsion System of a Modern Multisystem–Locamotive", EPE Firenze, (1991), pp. 4–632–4 637.

N. Saridakis, "Golf mit Otto–Elektro–Hybridantrieb", ATZ, Atutomobiltechnische Zeitschrift 87 (1985) 11, pp. 581–584.

H. Baumann, Siedekühlgefäss mit Luftrückkühlung für Traktionsstromrichter hoher Leistung:, etzArchiv, vol. 11, 1989, No. 7, pp 213–220.

E. Blessmann, "Magnetic Couplings", Machine Design, Feb. 9, 1989, pp 105–108.

L. Kung et al. "Hybrid III: Concepts for the Electric Systems of a Hybrid Passenger Car, Symp Proc 11th INT Electric VEHIC Symp NA (NA) NA 1992", pp. 13 total.

SYSTEM FOR ACTIVELY REDUCING ROTATIONAL NONUNIFORMITY OF A SHAFT, IN PARTICULAR, THE DRIVE SHAFT OF AN INTERNAL COMBUSTION ENGINE, AND METHOD OF OPERATING THE SYSTEM

This is a continuation of PCT/DE96/01613 filed on Aug. 31, 1996 which claims priority from German Patent Application No. 195 32 163.4 filed on Aug. 31, 1995.

BACKGROUND OF THE INVENTION

1. Field of the Invention

The present invention relates to systems for reducing rotational nonuniformities of shafts and in particular a draft shaft of an internal combustion engine.

2. Description of the Related Art

The invention concerns a system for actively reducing rotational nonuniformity of a shaft, especially the drive shaft of an internal combustion engine or a shaft which is coupled or can be coupled to it.

More simple systems of this type are known, which can only act by driving or only by braking an internal combustion engine to reduce its rotational nonuniformity. Thus, Patent Abstracts of Japan, Volume 11, No. 28 (M-557), Jan. 27, 1987 & JP-A-61 200 333 (NISSAN I) discloses a synchronous electrical machine that is directly coupled to the crankshaft of an internal combustion engine and is switched like a (driving) electric motor when the rotational speed falls below a certain standard value and thus counteracts a rotational nonuniformity to slow down (a so-called negative rotational nonuniformity). The motor is shut off when the rotational speed goes beyond this standard value.

A purely brake type system is disclosed by Patent Abstract of Japan, Volume 4, No. 29 (M-002), Mar. 14, 1980 & JP-A-55 005 454 (TOYOTA). Here, an electromagnet surrounds the outer rim of a flywheel on the crankshaft of an internal combustion engine. The electromagnet is excited synchronously with rotational nonuniformities and thus brakes the flywheel in correct phase, acting like an eddy current brake.

Similarly, EP-B-0 427 568 (ISUZU) discloses an internal combustion engine with a conventional belt-driven dynamo, which acts like a brake when there is a rotational nonuniformity to speed up (a so-called positive rotational nonuniformity). Finally, DE-A-32 30 607 (VW I) also discloses an internal combustion engine with a flywheel-dynamo, which acts like a brake when there is a rotational nonuniformity during phases of positive nonuniformity. The dynamo can also serve as a starter for the internal combustion engine.

Systems which can alternately act as drives and brakes to actively reduce rotational nonuniformities are also known in the state of the art:

Thus, EP-B-0 175 952 (MAZDA) discloses such a system with a commutator machine, having two stator windings-one for driving and one for braking. Through alternating correct-phase excitation of these two stator winding ,the machine alternately behaves like a drive and a brake.

Patent Abstracts of Japan, Volume 7, No. 240 (M-25), Oct. 25, 1983 and JP-A-58 126 434 (NISSAN II) disclose a system with a commutator machine, wherein the electrical energy obtained here by braking is saved in a capacitor and again used for driving.

DE-A-41 00 937 (FICHTEL & SACHS) discloses a system with a synchronous alternating current machine, which can generate a torque with periodically changing direction. The synchronous machine is configured such that the torque fluctuations occur in a fixed phase position relative to the crankshaft, so that they can counteract certain rotational nonuniformity orders of the internal combustion engine. But in order to allow a certain adjustment of this fixed phase relationship, the stator winding arrangement of the synchronous machine can have several winding strands laid down in opposite peripheral direction, which can be optionally energized with current.

These known systems essentially enable an active reduction of rotational nonuniformity.

More remote state of the art shall also be mentioned below, pertaining to certain configurations of the invention:

EP-A-0 604 979 (NIPPONDENSO) discloses an active vibration dampening system, in which a direct current machine furnishes alternating moments phase-shifted to rotational nonuniformities, in order to dampen vibrations of the vehicle in this way.

EP-A 0 437 266 (MAGNET-MOTOR) and DE-A 33 35 923 (VW II) disclose flywheel accumulators for hybrid vehicles.

DE-A 33 38 548 (VW III), DE-A 44 08 719 (VW IV), DE-A 0 938 680 (MÜLLER), DE-A 0 282 671 (MEYER) and U.S. Pat. No. 2,790,917 (TROFIMOV) concern electromagnetic couplings.

DE-A 32 43 513 (VW V) discloses an electric machine in whose proximity a mechanical coupling is arranged.

H. Deisenroth, C. Trabert: "Avoidance of Voltage Surge in Pulse Invertor Drives," etc., 1993, 1060, concerns pulse invertor drives.

DE-A 42 30 510 (GRÜNDL & HOFFMANN) and W. Geissier, F. Unger-Weber: "Modeling the Three-Phase Propulsion System of a Modern Multisystem Locomotive," EPE, Florence, 1991, 4-632, disclose liquid-cooled invertor.

J. Langheim, J. Fetz: "Electric Citybus with Two Induction Motors—Power Electronics and Motor Control," ETEP, Vol. 2, No. 6, November/December 1992, 359, concerns a field-oriented regulation of an electric machine.

SUMMARY OF THE INVENTION

A system for active dampening of rotational nonuniformities of the crankshaft (10) of an internal combustion engine (1) or a shaft coupled to it comprising

- an electric rotary-field machine (4), which applies alternating torques to the crankshaft (10) or the shaft, so that it counteracts positive and negative rotational nonuniformities,
- at least one invertor (17), which generates the voltages and/or currents of variable frequency, amplitude and/or phase required for the magnetic finds of the electric machine (4) by sine-evaluated pulse modulation with a clock frequency greater than 10 kHz;
- wherein the invertor (17) has an intermediate circuit with higher voltage level than an on-board network;
- and wherein the invertor (17) is outfitted in the intermediate circuit with an energy accumulator (19, 24) for buffering of energy accruing during the active dampening;
- wherein both the removal of energy from the intermediate circuit during motor operation of the electric machine (4) and the feeding of energy into the intermediate circuit in generator mode each occur at the elevated voltage level.

BRIEF DESCRIPTION OF THE DRAWINGS

The invention shall now be explained more closely by means of sample embodiments and the enclosed schematic drawing. The drawing shows.

Figure 1A:
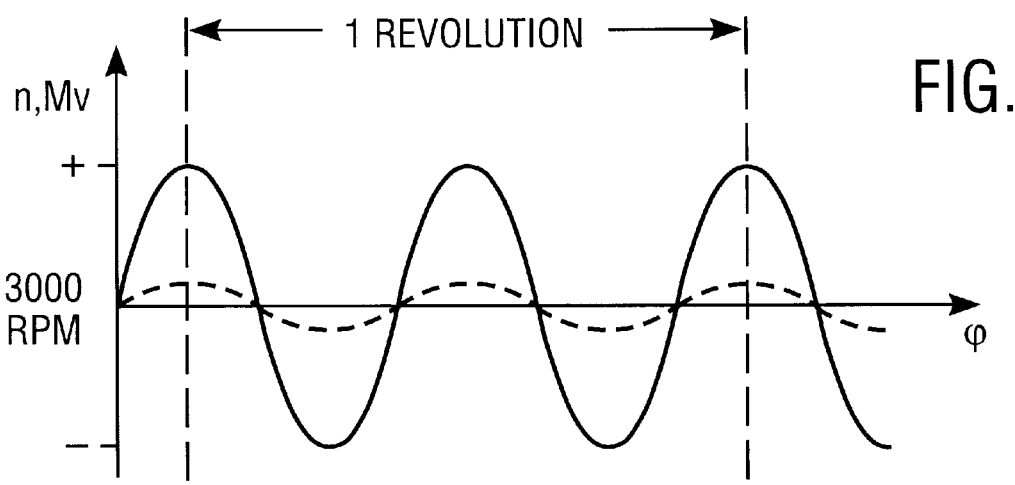
FIG. 1 a schematic sample representation of the functioning of the system for active reduction of rotational nonuniformities.

In the figures, parts essentially identical in function bear the same references.

DETAILED DESCRIPTION OF THE EMBODIMENTS

The invention starts with the technical problem of modifying the aforesaid systems for active reduction of rotational nonuniformity and, in particular, specifying a system with high variability with respect to diverse kinds of rotational nonuniformity and different operating conditions, e.g., of an internal combustion engine.

It solves this problem with a system for active reduction of rotational nonuniformities of a shaft, in particular, the drive shaft of an internal combustion engine with

- at least one electric machine, especially a rotary-field or traveling wave machine, which is coupled or can be coupled to the shaft;
- at least one invertor for generating the voltages and/or currents of variable frequency, amplitude and/or phase required for the magnetic fields of the machine;
- at least one control device, which controls the invertor and, thus, the electric machine in such a way that the machine counteracts both positive and negative rotational nonuniformity of the shaft (Claim 1).

In particular, rotational nonuniformity can be such as occurs in an internal combustion engine, particularly a piston engine with internal combustion, through the gas and mass forces of the individual pistons acting on the drive shaft (i.e., especially the crankshaft). For example, in a four-cylinder four-stroke engine, relatively large rotational nonuniformity occurs in the second order (i.e., twice the rotational frequency of the engine); correspondingly, in a six-cylinder, four-stroke engine, it occurs in the third order. Furthermore, there is rotational nonuniformity at higher orders, as well as stochastically occurring nonuniformities. The internal combustion engine can be, e.g., a two-stroke or a four-stroke engine with an even number of cylinders (e.g., 2, 4, 8, 10, 12 cylinders, etc.) or an odd number of cylinders (1, 3, 5, 7, 9, 11, etc., cylinders) (which may operate by the Otto or the Diesel principle). In theory, it can also be different kind of internal combustion engine, such as a piston engine with external combustion (so-called Stirling engine). Another possibility is a rotary engine (e.g., a Wankel engine), in which at least the gas forces can produce rotational nonuniformity. Moreover, one can consider turbines, especially gas or steam turbines. Although the rotational nonuniformities in these are generally slight, the invented system can also be extremely beneficial in them, for applications in which especially good true running is needed.

But the invented system is not only suitable for active reduction of rotational nonuniformity produced by a drive assembly (e.g., that of a motor vehicle, a rail vehicle, or a ship), as is the case in the above-mentioned examples. Rather, it can also deal with rotational nonuniformity arising in a power train—i.e., between the drive assembly and the takeoff point, through universal joints, three-dimensional shaft vibrations, or gear wear, for example. The invented system can also effectively diminish such rotational nonuniformity.

A drive system could also be outfitted with several of the invented systems for active reduction of rotational nonuniformity, e.g., a first system in a motor vehicle could act directly on the crankshaft of the drive assembly (internal combustion engine), while a second system downstream from the coupling, e.g., between coupling and transmission, serves to reduce rotational nonuniformity of the drive train.

An "electric machine" is any kind of machine for rotational movement, which can be operated as both an electric motor and an electric brake, or a generator if necessary. By "rotary-field machine"—in contrast with a commutator machine—is meant a machine in which a rotary magnetic field occurs. This can be, for example, an induction or synchronous machine, especially for three-phase current, or a machine with electronic commutation. In a rotary-field machine, the magnetic field sweeps through a complete 360° revolution, while in a traveling-wave machine it only sweeps through one or more segments. Thus, for example, the traveling-wave machine can be an induction or synchronous machine whose stators extend only across one or more sectors of the rotor-resembling one or more curved linear motors.

In theory, the coupling of the electric machine to the shaft can be indirect, e.g., through a transmission. Preferably, however, the coupling is direct, in which, for example, the rotor of the electric machine—similar to a flywheel—is mounted directly on the shaft (generally the crankshaft of the internal combustion engine) or perhaps an extension of the shaft that can be coupled in. Preferably, it is joined firmly and rotates together with the shaft.

The invertor can generate the voltages and/or current needed for the magnetic fields (in particular, rotary or traveling fields) with any desired (within certain limits) frequency, amplitude or phase, or any desired combination of these quantities. It can do this advantageously by means of electronic switch from a predetermined dc or alternating voltage or a predetermined direct or alternating current. To special advantage, all three quantities—frequency, amplitude and phase—are freely selectable.

On the whole, the invented system with its invertor drive has the advantage of effectively reducing the most diverse rotational nonuniformity with high variability during the most diverse operating conditions and almost totally suppressing it in many instances, being able to easily produce a desired superpositioning of an additional torque with the desired strength, when necessary.

The control device preferably controls the invertor such that the electric machine produces a rapidly alternating torque to reduce the rotational nonuniformity, namely, a braking torque for a positive rotational nonuniformity and a driving torque for a negative rotational nonuniformity, onto which it can advantageously superimpose, at least some of the time, a positive or negative torque to further achieve a driving action or a braking or generator-type action (Claim 2). For configurations in which the electric machine also acts as an electromagnetic coupling, a rapidly varying coupling slip of larger or smaller magnitude can take the place of the rapidly alternating braking and driving torque.

By "rapid variation" is meant a variation in the frequency range of the rotational nonuniformity being reduced, i.e., for the second-order rotational nonuniformity at a rotary speed of 3000 rpm (in more contemporary terminology expressed as $min^{-1}$) a variation with a frequency of 100 Hz. On the contrary, the possibly superimposed additional torque generally varies slowly or is constant—apart from possibly steep edges at the beginning or end of the superpositioning.

Thanks to the (especially additive) superpositioning of the additional torque in the desired direction and strength, the reduction of the rotational nonuniformity and the generation of the additional torque are decoupled from each. The rapidly varying torque is practically unchanged in its duration by the superpositioning, being only shifted relative to the zero line. As an exception, the rapidly varying torque changes only if the internal combustion engine actually shows an altered rotational nonuniformity on account of the change in load accompanying the switching in of the additional torque.

If the additional torque being furnished at the moment is smaller than the amplitude of the alternating torque at that time, the combined torque of the electric machine shows alternately positive and negative values—albeit shifted with respect to the zero line. If, on the other hand, it is larger than such, the combined torque is only positive or negative, and its magnitude contains a rapidly varying component. An additional braking torque can serve to make the electric machine diminish the coupling slip, perform a braking synchronizer function, act as a generator for current supply and/or produce or sustain a braking of the vehicle and/or reduce the slip of drive wheel by braking, perhaps as part of an antislip control. The braking energy (additional torque brake energy) obtained when using these brake functions as a generator can be saved up—like that resulting from rotational nonuniformity—(for example, in an electrical accumulator or in a flywheel accumulator) and later used as drive energy or be furnished to a power grid or, for example, the vehicle's battery. An additional drive torque an serve an accelerating synchronizer function or sustain (when the electric machine functions as a "booster") or produce an acceleration of the vehicle, for example, to cover a acceleration gaps, as in the case of a turbocharged engine.

In order to achieve the highest possible overall efficiency of the system, the energy obtained when reducing a positive rotational nonuniformity (rotational nonuniformity brake energy) and possibly the energy obtained from the additional braking torque (additional torque brake energy) is advantageously at least partially saved up and the saved rotational nonuniformity brake energy is at least partially used later on to reduce a negative rotational nonuniformity (Claim 3).

The saving of the rotational nonuniformity brake energy and possibly the additional torque brake energy can be done in particular by the following two configurations of the system, namely, by an electrical accumulator or a mechanical accumulator (flywheel accumulator), and also by a combination of the two:

In the first configuration, the invertor is an intermediate invertor, whose intermediate circuit has at least one electrical accumulator for brake energy or is coupled to at least one such accumulator (Claim 4). The accumulator can be, in particular, a capacitance, an inductance and/or a (fast-acting) battery. It can either serve exclusively for the accumulation of brake energy (in this case, it will be switched in generally in addition to a normally present intermediate accumulator, which an furnish the necessary voltage or current pulse during the invertor's operating cycle), or it can serve only partially for the accumulation of the brake energy, i.e., save up yet other energy—which may be needed for the operating cycle (in the latter case, it could coincide with the usual intermediate accumulator). Moreover, it may be advantageous in any case to design the rectifier as an intermediate rectifier—for example, even without intermediate accumulation of brake energy.

By an "intermediate circuit" is meant a circuit which an supply essentially dc voltage or direct current, from which an invertor component (the so-called machine invertor) can form variable alternating voltage or current by pulse or cycle operation. This dc voltage or direct current must generally satisfy special requirements, which can seldom be met by a car battery, for example. For example, in the case of a voltage intermediate invertor, the intermediate circuit must provide voltage pulses with extreme edge steepness and at high voltage level. A car battery is generally too slow for this and its voltage is too low. Generally speaking, an intermediate invertor comprises three subassemblies, namely, an input subassembly for supplying or taking away electrical energy, an output subassembly in the form of the machine invertor, and the intermediate circuit which comes between these. Since the electrical energy in the system for reduction of rotational nonuniformity is also obtained through the machine's current converter and be taken away again through this after interim accumulation the invertor can also in theory be self-standing, i.e., without an input subassembly. The term "intermediate circuit" in this case as well—even though the circuit is no longer between two subassemblies—designates the circuit with the aforesaid function of furnishing dc voltage or direct current to the machine's invertor.

In the other configuration, a flywheel serves to accumulate the brake energy (Claim 5). Preferably, the flywheel is electrically coupled to the system by an electric machine. This can be, for example, a rotary-field or commutator machine controlled by its own rectifier. Both rectifiers can be advantageously electrically coupled together in their intermediate circuit. The electric machine for reducing the rotary nonuniformity and the flywheel machine work in opposite cycle: when the former is braking, the latter is accelerating the flywheel, and when the former is driving or not raking so much, the latter is braking the flywheel. Since relatively high energy densities can be built up with such a flywheel energy accumulator, its use is especially advantageous when it is necessary to accumulate the initial coupling slip energy or when rotational nonuniformity is present with relatively large energy content, such as can be the case in a three-cylinder, four-stroke diesel engine. The flywheel energy accumulator can also be combined with the above-mentioned electrical accumulator.

Because of the high variability of the invertor-controlled electric machine, in addition to the active reduction of rotational nonuniformity it can also perform other functions at the same time or staggered in time and thus replace machines which are traditionally specialized in these functions. In particular, it can also have the function of a starter, e.g., for an internal combustion engine (Claim 6). Preferably, the electric machine is designed as a direct starter, i.e., it is directly coupled or can be coupled to the drive shaft of the internal combustion engine and is configured such that it can start the engine by merging in from standstill. By "direct coupling" is meant, in particular, a gearless coupling of the rotor of the electric machine with the drive shaft. The rotary speed of the rotor is preferably equal to the rotary speed of the internal combustion engine. When "merging in," the ratio of the momentary rotary speeds of the electric motor and the drive assembly—unlike the case of a flywheel starter—remains essentially constant (and in particular, its value is unity). Merging in "from standstill" means that the electric machine and the drive assembly—unlike the case of the aforesaid flywheel starter—run up together from standstill. Preferably, the rotor of the electric machine is placed on the drive shaft (generally the crankshaft) of the internal combustion engine or an extension that is coupled or that can be coupled to it. It is preferably coupled or can be coupled firmly to the drive shaft or the extension.

Traditional starters, on account of their high translation ratio, only bring the internal combustion engine up to a relatively low starting speed (typically 80–250 rpm), which is far below its idling speed (typically 600–800 rpm). The difference between starting speed and idling speed must then be overcome by the engine under its own power. For this, however—since at these speeds it is far below its idling speed in a very unfavorable operating range—it requires a relatively large amount of fuel, which moreover is only incompletely burned. Therefore, each starting of the engine involves additional fuel consumption and especially polluting emissions. Preferably, therefore, the system is configured such that the electric machine is in driving mode, at least essentially until reaching the idling speed of the internal combustion engine (which usually lies between 600 and 800 rpm at operating temperature). This provision allows the engine to start only when attaining its idling speed and thus eliminates the unfavorable running up under its own power. In this way, it reduces the fuel consumption and the particularly harmful emissions during starting and also makes the starting process quicker.

The electric machine can alternatively or additional have the function of a generator for electricity supply, e.g., to charge a battery or energize a power grid (Claim 7). During the starting process, it is generally not necessary to reduce rotational nonuniformity; for this, the electric machine will be operated temporarily as a pure electric motor. On the other hand, the generator function is generally also desirable when reducing rotational nonuniformity. Averaged out over time, a gain in electric energy is achieved by superimposing the rapidly varying torque with a simultaneously braking torque.

In corresponding manner, the electric machine can also produce or sustain an acceleration and/or braking of the shaft as an additional function (Claim 8). For example, this can serve to accelerate a motor vehicle, along with the drive assembly. For braking a vehicle, the electric machine can serve as a wear-free, possibly generator-type brake or extra brake. In combination with an antislip control, the electric machine can quickly reduce the total drive torque and, thus, the slip of one or more drive wheels by braking. In electromagnetic coupling function, the drive wheel slip can be reduced by increasing the coupling slip, instead of by braking. When performing these additional functions, it is possible to switch off the function of reducing the rotational nonuniformity, or both functions can be implemented at the same time, by superimposing an appropriate driving and braking torque—as explained above.

The brake energy obtained when employing these additional functions can be saved (e.g., in the electric accumulator or in the flywheel accumulator)—like that resulting from rotational nonuniformity and later used as drive energy or be supplied to a network or, for example, the car battery. In order to achieve the highest possible efficiency of brake energy recycling when braking the vehicle by means of he electric machine, it is advantageous to separate the electric machine from the drive assembly by means of an intervening, e.g., mechanical coupling during braking.

In traditional motor vehicles, other vehicles, and also stationary drive assemblies, there are often auxiliary machines which—since they consume relatively high power—are mechanically driven by the drive assembly, such as through belt drives. This may involve, for example, air conditioners, servo-drives, pumps or the like. Such a mechanical drive coupling is generally not optimal, since the auxiliary machine must follow the drive assembly through the speed conditions dictated by it. Thus, it does not run constant at its optimal speed and, furthermore, it must also be running when this is not even necessary, due to no need for auxiliary power. In order to overcome these disadvantages, it is preferable that the electric machine furnish current at relatively high voltage level, preferably in the upper part of the low voltage region, where no special electrocution protection measures are necessary (e.g., around 60 V dc voltage). If one goes beyond this, a range of 250–450 Volts is preferably selected. Auxiliary machines are operated with electrical advantage at these high voltage levels (Claim 9). Such a high voltage level can already exist, in particular, in the intermediate circuit of an intermediate invertor, and thus need not be specially generated for this additional purpose. An electrical instead of a mechanical drive for auxiliary machinery is therefore possible, since relatively small currents result from the high voltage level (in contrast with the 12-Volt level of a traditional automotive network). With electrical drive, one can have the auxiliary machines run at their optimal speed when required and otherwise be shut off. Thus, one achieves a distinct increase in the overall efficiency. For low-power consumers, a traditional low-voltage network (12 V or 24 V) can be provided.

The active reduction of rotational nonuniformity—as mentioned—is based on the fact that the electric machine can counteract positive and negative rotational nonuniformity, and thus acts as a brake for positive and as a drive for negative rotational nonuniformity. For this, the control device requires information about the time and possibly the magnitude of a positive or negative rotational nonuniformity.

One possibility of obtaining this information lies in a measuring of the momentary rotational nonuniformity or another quantity connected to it. If the operation of the electric machine is based on this information, we have an automatic (feedback) control, since the actual presence of a rotational nonuniformity leads to an immediate action on this rotational nonuniformity.

Another possibility is to use not the actual, but rather an expected rotational nonuniformity as information for operating the electric machine. Thus, we have here a (nonfeedback) control. For example, in an internal combustion engine, one can determine the magnitude and direction of the momentary rotational nonuniformity as a function of the (crank) shaft angle and one or more operating parameters (such as rotary speed and throttle valve position) by using a prototype or simulation on computer and outfit each mass produced engine with this information saved in the form of a characteristic diagram. During operation, the system then measures the momentary crankshaft angle present and the other operating parameters (such as rotary speed and throttle valve position), reads the corresponding memorized diagram values for magnitude and amplitude of the anticipated rotational nonuniformity, and controls the electric machine through the control device in order to counteract the rotational nonuniformity.

Furthermore, an adaptive control is possible, i.e., a (nonfeedback) control in which the control information is not fixed, but rather defined or at least modified by measuring earlier rotational nonuniformities.

Moreover, mixed forms of the mentioned kinds are possible, e.g., the expectation values memorized in a characteristic diagram may be adaptive with respect to an anticipated quantity (such as the amplitude), while they can be fixed with respect to another expected quantity (say, shaft angle). One can also combine automatic control and open-loop control, say, by taking the shaft angle as a expectation value from a characteristic diagram, while the amplitude information is derived from a measurement of the momentary rotational nonuniformity. Also, a very advantageous combination is an automatic control with servocontrol, in which the automatic control in each control interval is first adjusted to an expected rotational nonuniformity value from a characteristic diagram (servocontrol) and then works off the generally slight deviations between the actual value and the preset value (automatic control). This type of control provides a very fast and exact regulation with relatively low expense. It may also be advantageous to work with automatic (feedback) control at low speeds (e.g., idling), and to switch to open-loop (nonfeedback) control at higher speeds (Claim 10).

Each of these different types of control has its advantages and disadvantages: A characteristic diagram control is especially simple, but allows an adaptation to production or wear-related variations in the rotational nonuniformity characteristics and, furthermore, also cannot reduce stochastic rotational nonuniformities. An automatic control does not have these latter disadvantages, but places high demands on the speed of metered data acquisition and processing; also, it must satisfy stability conditions. An adaptive control and mixed forms of control can combine the advantages of automatic and open-loop control.

In automatic control, adaptive open-loop control, and corresponding mixed forms, the metered quantity need not immediately be the rotational nonuniformity (possibly derived from a measurement of the angle position or angular velocity as a function of time). Instead, it can also be one (or more) other quantities which allow a conclusion as to at least some of the rotational nonuniformities occurring. In an internal combustion engine, this quantity can advantageously be the gas pressure in one or more engine cylinders. For the gas pressure is a major variable source rotational nonuniformities. Furthermore, another important, practically unchangeable source should be taken into account—the mass forces. Their magnitude can be permanently saved in a characteristic diagram. As an alternative (or supplement), the momentary torque of the engine can be measured, e.g., by means of a torque hub. Thus, using the gas pressure and/or the momentary torque as a metered quantity enables a relatively and fast automatic control, adaptive open-loop control, or corresponding mixed form (Claim 11).

In cases where radial forces are also acting on the shaft—as in a piston engine—the shaft will generally also be excited in radial vibrations, in addition to rotational nonuniformities. It is therefore advantageous that the electric machine have a field sector or several field sectors with at least partly independently controllable traveling waves, the traveling wave(s) in the field sector(s) being controlled such that the electric machine also reduces radial vibrations of the shaft, in addition to rotational nonuniformities (Claim 12). This is explained as follows: In a closed-circle (360°) rotary-field machine, the magnetic forces acting on the shaft cancel each other for symmetry reasons, so that only torques remain as a result. If, however, the magnetic field extends only across one sector (i.e., fewer than 360°), the field will generally produce, besides a torque, also a force with at least one component in the radial direction of the shaft. With a sector machine, therefore, radial vibrations can also be reduced. For this, the electric machine will be controlled such that the magnetic force acting in the radial direction is opposed to the deflection of the radial vibration occurring at the time. With a single field sector, a simultaneous reduction of rotational nonuniformities and radial vibrations is generally only approximately possible. An even better effect is accomplished with several independently controllable traveling waves (e.g., 2, 3, 4, 5, 6, 7, 8, etc.). Of course, the several field sectors can be brought together spatially in a circularly revolving stator, as long as they only act functionally as field sectors and are independently controllable. An electric machine with several independent field sectors, in any case, can also be viewed as several electric machines acting on a common rotor.

As an alternative to the use of an electric machine with independent field sectors, the system can also have at least one actuator (linear actuator) which can exert radial forces on the shaft and be controlled such as to counteract radial vibrations of the shaft. The actuator, for example, can have the form of several electromagnets or piezoelectric actuators, acting on the shaft opposite the phase of the radial vibration.

In order to move radial resonance vibrations of the shaft out of the operating speed range, the rotor of the electric machine can be preferably configured as a passive vibration absorber, or such a unit can be switched in parallel with it.

The electric rotary-field machine or traveling-wave machine (or linear machine) of the system is preferably an induction machine, a synchronous machine, or a reluctance machine, especially for three-phase current (Claim 13). An induction machine generally has a relatively simple rotor (generally a rotor with short-circuit windings or windings whose ends go to slip rings) and therefore has advantages in respect of manufacturing costs and mechanical load capability. However, its control engineering is relatively complicated, since magnitude and phase angle of the rotor current can be measured as a function of load, but not directly in terms of stator quantities. But a knowledge of the rotor current is necessary for adjusting a particular torque. On the other hand, synchronous machines (they have rotors with distinct poles, which are excited by permanent magnets or current) generally have larger production costs. On the other hand, their control engineering is easier to operate, since their torque is essentially dependent on the rotor angle and can be directly measured by means of a rotor position pickup. In those configurations of the system which have a high control expense by their nature—such as the above-explained machine with several independent field sectors—a synchronous machine can therefore be especially advantageous. Reluctance machines belong to the synchronous machines in the broad sense.

In particular, the control of the electric machine in the case of the induction machine is preferably based on a field-oriented automatic control (so-called vector control) (Claim 14). Starting with directly measurable momentary quantities, such as the imposed voltage, stator current, and perhaps rotary speed, using a computerized dynamic machine model, the stator current is broken down into a torque-forming component, which generates the torque with the rotor flux, and a component perpendicular to this, generating the machine flux, thus determining the torque. This control method allows one to adjust a desired torque with high precision—even though the current relationships in the rotor are not directly measurable.

The system for active reduction of rotational nonuniformities is generally an auxiliary system, which is arranged, for example, in the drive train of a motor vehicle with an internal combustion engine as the main system. Because its auxiliary nature, it should take up little space relative to the main system, and therefore should be as compact as possible. The advantageous measures mentioned hereafter serve such a compact construction—besides other advantageous purposes.

One step for achieving good compactness is for the electric machine to have a fine pole division, in particular, at least one pole per 45° angle of the stator (Claim 15). In a full-circle (360°) machine, this corresponds to a total of at least 8 poles. Even smaller polar divisions are especially advantageous, corresponding to 10, 12, 14, 16 or more poles in the closed-circle machine. A fine polar division allows the stator winding heads to be small, both in the axial and the peripheral direction of the machine, so that the machine can be shorter overall in the axial direction.

Also, with a finer pole division, the stator back for the return magnetic flux can be thinner (and, thus, also lighter), with the result that the rotor can have a larger diameter for the same outer diameter of the machine. A larger rotor diameter leads to a larger torque, on account of the longer air gap in the peripheral direction and the larger active lever arm. Thus, on the whole, a finer pole division leads to a lighter and more compact machine. In addition, the resistive losses are less on account of the shorter length of the winding wires—smaller winding heads require less nonactive winding wire. Since, moreover, the stray field (which essentially determines the reactive power component) depends on the winding head surface, it is relatively slight for a fine pole division. A slight stray field is especially advantageous for reducing the rotational nonuniformity, because in this case—unlike a conventional electric machine—there is an ongoing alternation between engine and generator operation and reactive power must be continuously consumed with the corresponding pole reversal.

Fine pole divisions are not customary for high-speed rotary-field machines, since they result in a relatively high frequency of pole reversals. A customary value for the pole reversal frequency is 120 Hz, for example. The electric machine used in the context of the invention, on the other hand, preferably has a high maximum pole reversal frequency, preferably between 300 and 1600 Hz or more, especially preferably between 400 Hz and 1500 Hz (Claim 16).

In order to lessen the influence of eddy currents in the stator—which increase with higher pole reversal frequency—the stator preferably has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla (Claim 17).

As a further measure contributing to a compact construction, the electric machine preferably has an inner fluid cooling (Claim 18). The fluid can be gas (e.g., air), or preferably a liquid (e.g., oil). A very effective cooling technique consists in placing the machine entirely under oil in the interior. However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and the fluid cooling is preferably a spray fluid cooling. There is then always only as much cooling fluid in the machine as is required at the time to carry away the loss power. At very high loss power and/or low rotary speed, the entire machine can be placed under oil. The spray fluid cooling ensures an especially good distribution of the fluid.

Quantitatively, the compactness can be expressed in terms of the "torque density." Preferably, the electric machine has a high torque density—as compared to the maximum torque—which is especially preferably greater than 0.01 $Nm/cm^3$ (Claim 19).

As explained above, radial vibrations can also often occur on a shaft with rotational nonuniformities, especially the crankshafts of internal combustion engines. In order to be robust to radial vibrations, the system is preferably designed such that the electric machine works far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm (Claim 20). Operation far into the saturation range makes it possible to design the machine relatively broad air gap. Changes in the air gap—such as occur during radial vibration—have little effect, due to the operation in the saturation range. Besides robustness to radial vibrations, this provision also allows a lowering of the precision requirements and, thus, considerable simplification in the manufacture of the electric machine.

Such a compact-construction electric machine generally has relatively low inductance. Yet in order to achieve, for example by means of a synchronized voltage, the most precise sinusoidal current to generate the electrical rotary fields or traveling waves, the invertor here preferably works at least sometimes with a higher cycle frequency, in particular, 10 kHz to 100 kHz or more (Claim 21). This provision is also advantageous for achieving a high temporal resolution for the system; for example, with a cycle frequency of 20 kHz, one can achieve a temporal resolution in the torque behavior of the electric machine of 2 kHz, with which one can effectively reduce a rotational nonuniformity at 200 Hz (200 Hz corresponds, for example, to the fourth order 3000 rpm). A high cycle frequency, moreover, also has the advantage of enabling compact construction for the invertor itself: Since, for example, in a voltage intermediate invertor, the capacitance in the intermediate circuit, which provides the intermediate circuit voltage for the electronic switches of the invertor, is inversely proportional to the frequency, so that a smaller capacitance will suffice for this at higher cycle frequency. The smaller intermediate circuit capacitors can be placed directly next to the electronic switches with short conductor pathways. Moreover, a necessary EMC filtering (EMC: electromagnetic compatibility) of the invertor can be more compact, since the size of the filter is inversely proportional to the cycle frequency.

As a further advantageous provision for achieving a compact construction of the invertor, electronic switches of the invertor are fluid-cooled, preferably boiling bath cooled (Claim 22). As the boiling bath coolant, one can use a fluorohydrocarbon, for example. In boiling bath cooling, the coolant evaporates at hot spots and in this way obtains its relatively high heat of evaporation from them. The vapor rises and can condense, for example, in an external cooler, thereby surrendering its heat of evaporation. This cooling technique enables the most compact arrangement of the electronic switches of the invertor without any cooling body. Furthermore, it has the advantage that relatively slight temperature differences are enough to achieve even high cooling performance: Whereas in the case of air cooling a temperature difference of 40° C. is usually necessary between cooling surface and the housing of a chip being cooled, here a difference of 2–10° C., especially around 5° C., is already enough. As a result, high ambient temperatures are tolerable, for example, an ambient temperature up to 60° C. for a chip temperature of 65° C. The absence of cooling bodies and the compactness which can be achieved furthermore allows good jolting resistance; moreover, the boiling bath enables the creation of an oxygen-free atmosphere in the region of the electronic components of the invertor, which generally tends to extend the lifetime. The housing which forms the cooling space—if it is not made of conducting material—can also serve as shielding. Electrical intermediate circuit accumulating elements for providing the voltage or current to be synchronized can be arranged inside the cooling housing, thus enabling short conductor lengths. A separate electrical brake energy accumulator, if necessary, can be arranged inside or outside the cooling housing. In the latter case, the possibly relatively high lead inductances are not a problem, since the brake energy accumulator operates on a relatively "slow" time scale.

Another advantageous cooling technique consists in connecting several electronic switches of the invertor, especially 2–20 or more, in parallel (Claim 23). The parallel circuit yields a distributed arrangement of heat sources and, thus, relatively low loss power density.

The invertor preferably contains semiconductor elements as switches, preferably fast semiconductor switches, such as field effect transistors—especially preferably metal oxide semiconductor (MOS) field effect transistors, bipolar transistors, and/or bipolar transistors with insulated gate connection (IGBTs) (Claim 24). By "fast" semiconductor switches are meant, in particular, ones which allow maximum clock frequencies of 10–100 kHz or more. MOS field effect transistors have the relatively lowest losses at high clock frequencies. They have an ohmic characteristic (whereas other semiconductor elements generally have a fixed loss characteristic), so that the losses are relatively low in partial load operation.

The invertor generates the voltages and/or currents necessary for the magnetic fields of the electric machine, preferably through pulses, especially on the basis of pulse width or pulse amplitude modulation (Claim 25). With constant intermediate circuit voltage, nearly sinusoidal currents of arbitrarily adjustable frequency, amplitude, and/or phase can be generated by sine-reinforced [? "bewehrt"] pulse width modulation at high clock frequencies, thanks to the machine inductance. In pulse amplitude modulation, one starts, for example, with an invertor with variable intermediate frequency voltage and thus generates pulses of different amplitude.

For optimal utilization of the available space in a motor vehicle, for example, it is advantageous to integrate a coupling, preferably a "travel coupling," in the electric machine, especially in its rotor (Claim 26). For example, in an induction and synchronous machine similar to a linear motor with interior rotor, the rotor can be nonfunctional in its inner region and thus have a hollow construction to accommodate, for example, a frictional coupling which can be engaged and disengaged. In this way, it is possible for the electric machine plus integrated coupling to take up only as much space in the axial direction, or just a little more, as the coupling itself require a conventional motor vehicle. Because of the reduced available diameter, and to minimize the moment of inertia, a multidisk and/or multiplate coupling design is preferable. If the integrated coupling is a wet coupling, the coupling fluid can also provide for the cooling of the electric machine. Activation of the coupling can be mechanical, electrical, magnetic, electromagnetic, hydraulic, pneumatic, or a mixture of these.

In order to identify the instantaneous angular position of the shaft at any time in the system, the electric machine or the shaft is advantageously outfitted with a rotor position or shaft position pickup (Claim 27). From the information on the instantaneous angle position, a conclusion can be drawn as to the instantaneous angular velocity and acceleration and, thus, the instantaneous rotational nonuniformities. In an automatic control system, the reduction of the rotational nonuniformity can be based on this information—as explained above. In an open-loop control system, the information on the instantaneous angle position and possibly the instantaneous mean rotary speed is used to read out the correct expectation value from the characteristic diagram. The information on the instantaneous mean rotary speed is also used to determine the magnetic fields required in the machine, as is the information on the instantaneous angle position of the rotor in a synchronous machine. To obtain the most precise angle position information possible, a rotation transformer (so-called "resolver") can be used in particular, i.e., a transformer with translation ratio dependent on angle. Higher-resolution encoders can also be used for this purpose, e.g., a combination of a high-resolution incremental pickup and a simple absolute pickup.

The electric machine can be designed such that it also works as an electromagnetic clutch in the drive train and/or as an active transmission synchronization device or a part thereof. For this, for example, the drive shaft coming from the internal combustion engine can be coupled to the rotor, and the takeoff shaft leading to the transmission can be coupled to the stator, which is mounted so that it can rotate in this configuration (or with the positions of rotor and "stator" reversed). The machine corresponds, e.g., to a normal machine with rotor and stator, which can also rotate as a whole in addition to the rotor rotation. The machine, able to as a whole, can generate positive and negative relative torques between rotor and "stator." In this way, any desired (even vanishingly small) coupling slip can be adjusted, and an active acceleration or braking of the shaft leading to the transmission can be achieved for purposes of transmission synchronization.

The electromagnetic coupling function can also be used advantageously for a modified form of starting. In fact, relatively large torques need to be provided for direct starting of the drive assembly. As an alternative, for the case of small torque not sufficient for this, the electric machine can be advantageously designed as a gyrating mass starter with electromagnetically coupled gyrating mass. The gyrating mass is advantageously the rotor or the stator, possibly together with the connecting shaft leading to the transmission. With the gear disengaged, this can be run up to high speed as an electric motor, buttressed by the inertia of the drive shaft and the compression of the engine. By "electromagnetic coupling" with the electric machine itself, the gyrating mass is quickly braked, thus accelerating the drive shaft such that the engine turns over.

The invention is also addressed to a method of active reduction of rotational nonuniformities of a shaft, especially the drive shaft of an internal combustion engine, with at least one electric machine, especially a rotary-field or traveling-wave machine, which is coupled or can be coupled to the shaft, and at least one invertor for generating the voltages and/or currents of variable frequency, amplitude and/or phase, needed for the magnetic fields of the machine, wherein at least one control device controls the invertor and, thus, the electric machine such that this counteracts positive and negative rotational nonuniformities of the shaft (Claim 28).

The method can be implemented advantageously with a system according to one or more of the above-explained configurations (Claim 29). As for individual features and advantages of the method, refer to the above explanations on the system, which also apply fully to the method in its different configurations.

The subjects of Claims 4–27 and 29 can also be advantageous in a system or method for active reduction of rotational nonuniformities of a shaft, in which the electric machine counteracts only positive or only negative rotational nonuniformities. We therefore reserve the right to address patent claims to these subjects by omitting the feature "positive and negative (rotational nonuniformities)" now contained in Claims 1 and Claim 28.

Furthermore, in all of the present specification, numerical indications "x" shall be understood in the sense of "at least x," and only preferably in the sense of "exactly x."

FIG. 1a shows (by solid line) the rotary speed n of a shaft as a function of the crankshaft angle __. The shaft periodically executes speed fluctuations toward smaller and larger speeds about a mean speed (here, 3000 revolutions per minute), which in this idealized example have a basically sinusoidal appearance. The shaft is, for example, the crankshaft of a four-cylinder, four-stroke internal combustion engine of a motor vehicle, having in the second order (i.e., at a frequency of 100 Hz) relatively large rotational non-uniformity resulting from the gas and mass forces. As an illustration, the angle interval needed for one revolution of the shaft is also indicated. In general, rotational nonuniformities of higher orders and those of stochastic nature so occur on a shaft (not shown here). Thus, their appearance is generally not sinusoidal.

There are fluctuations in the torque Mv of the engine about a mean torque, basically proportional to the rotational nonuniformities. The solid line in FIG. 1a also illustrates the curve of the engine torque Mv as a function of the crankshaft angle __.

Figure 1B:
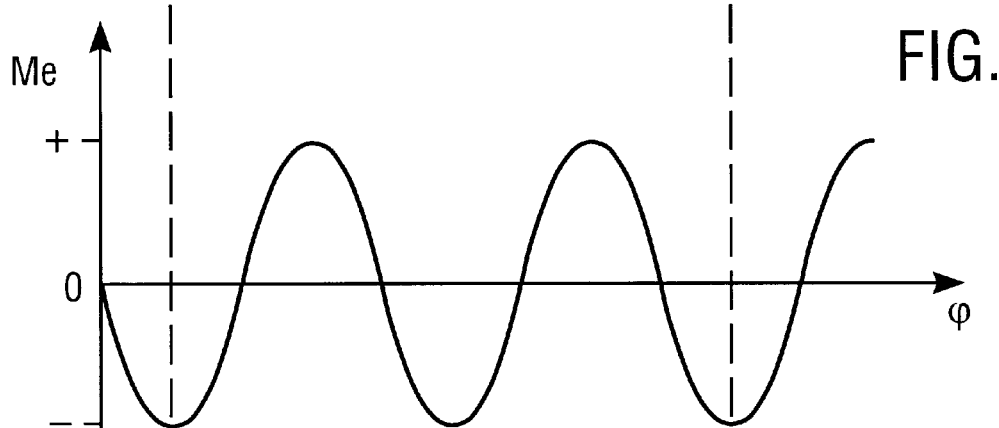

FIG. 1b shows the total torque Me as a function of the shaft angle __, which is applied by an electric machine coupled to the shaft. The curve of the machine torque Me largely corresponds to that of the rotational nonuniformity and the engine torque Mv, but is opposite in direction or phase. That is, when there is a rotational nonuniformity toward higher speed (so-called positive nonuniformity), the electric machine generates a torque to brake the shaft (so-called negative torque), whereas in the case of a rotational nonuniformity toward lower speed (so-called negative nonuniformity) it generates a driving torque (so-called positive torque). The magnitude of the torque Me is chosen such that the rotational nonuniformity—and the fluctuation of the torque Mv proportional to it—is substantially reduced or even virtually disappears through its action, as is illustrated in FIG. 1a by the broken line.

In the mode of operation shown in FIG. 1b, the negative and positive torque extrema are equal in magnitude. Thus, the energy obtained during a braking phase is essentially equal to the energy used up in the following drive phase. Therefore, the outward energy flux is zero, and brake energy is only buffered temporarily inside the system. Thus, the system in this operating mode work like a pure rotational nonuniformity reducer with rapidly varying torque, without generating an additional torque.

Figure 1C:
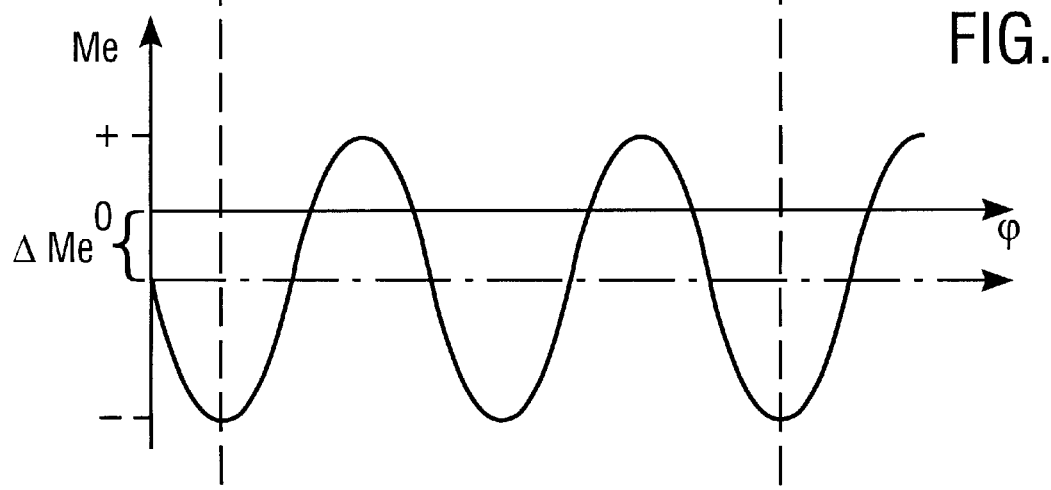

An example of an operating mode of the system modified from the preceding one, with an additional torque, is shown in FIG. 1c: The time course of the total torque Me corresponds to that of FIG. 1b, but it is shifted overall by a particular amount • Me (the so-called deviation) in the negative direction. The deviation • Me will generally vary slowly, but in the brief time frame represented here of approximately one period of rotation it is constant to a good approximation. The deviation • Me here is smaller than the amplitude of the rapid variation of the torque, so that the overall torque Me alternately takes on positive and negative values. Averaged over the rapid variation, one obtains a constant torque —• Me. Thus, on average, mechanical energy is withdrawn from the internal combustion engine, being largely transformed into electrical energy and taken out of the system. The electrical machine in this type of operation thus has the function of an electrical generator, besides the function of a rotational nonuniformity reducer, which can act as a brake and deliver current, e.g., to counterbalance operating losses of the system, to charge the vehicle's battery, and/or to operate electrical consumers.

If the deviation • Me is greater than the amplitude or reducing the rotational nonuniformity, the electric machine will only work as a brake a no longer as a drive, and the braking action will vary in magnitude according to FIG. 1b and 1c, in opposite phase to the rotational nonuniformity.

Both small and very large generator powers can be adjusted simply by an appropriate adjustment of the (software) control system of the electric machine—without any structural (hardware) changes. Only the size of the electric machine is a limitation. Thus, the very same machine type can be used, for example, for small and large vehicle types without design adaptation.

The overall torque curve can also be shifted in the positive direction (positive deviation). The electric machine then works as a (driving) motor, besides its function as a rotational nonuniformity reducer, to support the engine when accelerating the vehicle, for example.

Figure 2:
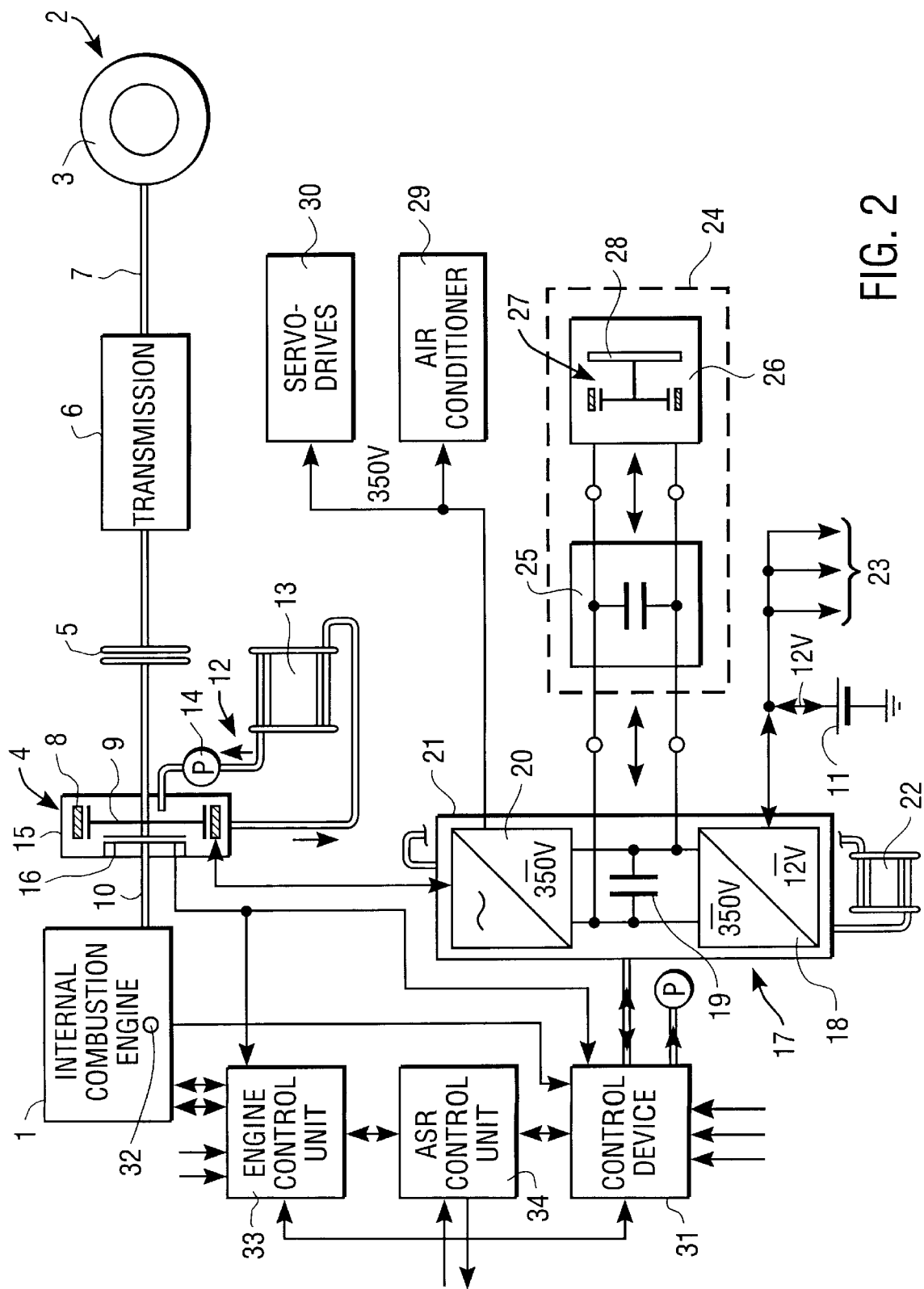
FIG. 2 a not-to-scale schematic representation of one embodiment of the system.

The drive system of a motor vehicle, such as a passenger car, represented in FIG. 2, has as its drive assembly an internal combustion engine 1, which can be a four-cylinder, four-stroke Otto or Diesel motor. The torque produced by the engine 1 can be transferred by a drive train 2 to drive wheels 3. In the takeoff direction, in the drive train 2, there first comes after the engine 1 an electric machine 4. This is followed by a travel coupling 5, a transmission 6, and an axle drive 7, which transfers the torque to the drive wheels 3. The coupling 5 and the transmission 6 can be a frictional clutch and a gearbox; alternatively, for example, an automatic coupling or transducer coupling are possible, each with gearbox or automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—comprises a stator 8 and a rotor 9. The former is stationary and thrusts against the internal combustion engine 1, the vehicle chassis (not shown), or a coupling housing (not shown), whereas the latter sits directly on a drive shaft (crankshaft) 10 of the engine 1 or an extension thereof and is firmly coupled to it. The drive shaft 10 and the rotor 9 thus rotate together, without a gearing coming in between.

The electric machine 4 fulfills several functions: On the one hand, it functions as a rotational nonuniformity reducer, as has already been explained in connection with FIG. 1. On the other hand, it functions as a generator to charge the vehicle's battery 11 and to supply electrical consumers and thereby replaces a dynamo normally present in the motor vehicle. Furthermore, the generator function can serve to brake the vehicle or the engine 1. In addition, the electric machine 4 can function as an additional motor ("booster"), e.g., to support the engine when accelerating the vehicle. It also serves as a starter for the internal combustion engine and thus can also replace a separate starter normally provided in the motor vehicle. Finally, by virtue of the moment of inertia of the rotor 9, it functions as a flywheel and can thus replace the flywheel generally present on the crankshaft in traditional motor vehicles.

The electric machine 4 is cooled on the inside by a spray fluid cooling 12. After going through a cooler 13 and a pump 14, the cooling fluid—here, a suitable oil—is sprayed onto the rotor 9, and this in proximity to its axis of rotation. Because of the rotation of the rotor and centrifugal force, it travels outwardly, thereby cooling rotor 9 and stator 8, and then exits a housing 15 of the electric machine 4, again returning to the cooler 13 in a closed circuit. Depending on the loss power an rotary speed, the flow of coolant is provided by corresponding control of the pump 14, so that each time only just the required minimum of cooling fluid is present inside the housing 15. In other configurations (not shown), the electric machine (or only the rotor) is integrated in a coupling and/or transmission housing and cooled by a lubricating and/or cooling fluid (e.g., clutch or transmission oil) located therein.

Furthermore, the electric machine 4 is outfitted with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: The stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used.

An invertor 17 provides the stator 8 of the electric machine 4, at a very high clock frequency (e.g., 100 kHz), with sine-reinforced pulse width modulated voltage pulses, which under the action of the machine's inductance basically yield sinusoidal three-phase currents, whose amplitude, frequency and phase are freely selectable.

The invertor 17 is a voltage intermediate-circuit pulse invertor and comprises three subassemblies: a dc voltage converter 18 (input assembly), which converts dc voltage from a low level (here, 12 V) to a higher intermediate circuit level (here, 350 V) or back again, an electrical intermediate circuit accumulator 19, here, a capacitor or an arrangement of parallel-switched capacitors, and a machine invertor 21 (output assembly), which can generate from the intermediate circuit dc voltage the (synchronized) three-phase alternating voltage of variable amplitude, frequency and phase or—when the electric machine 4 is operating as a generator—can convert an such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the invertor 17 are hermetically enclosed in a metal housing 21, which is filled with a suitable boiling type coolant. This is, for example, a fluorohydrocarbon, having a suitable boiling point, e.g., 60° C., at a suitable pressure (say, between 50 mbar and 3 bar). Evaporated coolant can condense in a condensation cooler 22 and return to the housing 21 in liquid form in a closed circuit. The housing 21 with the cooling circuit is hermetically tight.

The dc voltage converter 18 is connected, at the low-voltage side, with the vehicle's battery 11 and various low-voltage consumers 23, such as lighting and electronic devices. The invertor 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1. In other configurations (not shown), the vehicle's battery is at intermediate circuit level and coupled directly to the intermediate circuit.

The intermediate circuit accumulator 19 is connected to an external additional accumulator 24, which can be an electrical accumulator, here, an extra capacitance 25, and/or a flywheel accumulator 26. The additional accumulator 4 has the primary task of buffering the energy obtained from the rotational nonuniformity reducer in a brake phase and surrendering it again for the following drive phase. In addition, it can also serve to save that energy which accrues during other brake processes mediated by the electric machine 4. Finally, it can take strain off the vehicle's battery 11 when starting the engine 1, since it takes energy only slowly from the battery and saves it in the additional accumulator 24. Here, it is then available for fast removal during the starting process.

On the other hand, the (inner) intermediate circuit accumulator 19 has the basic task of providing voltage with the necessary steep rise time for clock purposes—i.e., quickly—to the machine-invertor group. It does not need any very high capacitance for this (e.g., it has 2•F), and in fact low lead inductances are more advantageous for speed purposes, which is ensured by the arrangement in the interior of the invertor 17 (and preferably on the same board on which the electronic switches of the machine-invertor 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own invertor-controlled electric machine 27 and a gyrating mass 28 coupled to it. The latter can be formed by a separate flywheel or be integrated in the rotor of the electric machine 27. The moment of inertia of the gyrating mass 28 is preferably 0.05 to 2 kgm$^2$. It is also possible to store a multiple of the energy needed to start the engine 1 in the flywheel accumulator 26 and quickly remove the particular energy needed for starting from it (i.e., in less than 1 second).

In other configurations (not shown), no separate additional accumulator 24 is provided. Here, the intermediate circuit accumulator 19 is dimensioned and possibly arranged outside the invertor 17 so that it can take on the function of the additional accumulator 24.

The intermediate circuit with its high voltage level (here, 60 V or 350 V) supplies various high-power consumers, such as an air conditioner 29 and servo-drives 30 with electrical energy. Whereas such high-power consumers are traditionally operated by mechanical coupling from the internal combustion engine 1, the high-voltage level available here allows a more efficient, purely electrical powering.

A control device 31, through appropriate actuation of its semiconductor switches, instructs the invertor 17 at each moment of time as to the amplitude, frequency, and phase that the alternating voltage generated by it should have. The control device 31, which can be formed, for example, by a correspondingly programmed microcomputer system, first determines the magnitude and the direction of the torque which the electric machine 4 is supposed to produce at a particular time. It can do this, e.g., by means of a characteristic diagram control system, in that it obtains, as input information from the rotation transformer 16, the angular position of the drive shaft 10, the mean rotary speed at the moment, and possible other operating parameters, such as the throttle valve position, and it determines from a memorized characteristic diagram the rotational nonuniformity to be expected at the moment, as a function of these operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, and also by picking up the instantaneous torque of the engine 1 by means of a torque hub (not shown) in the drive train. A combination of automatic and open-loop control is also possible. From the value thus determined for the instantaneous rotational nonuniformity, a corresponding (opposite-phase) value is derived for the rapidly changing nominal torque of the electric machine 4, onto which may be additively superimposed a positive or negative additional torque of desired strength. To start the internal combustion engine 1, the nominal torque can be determined on the basis of memorized values, which specify the nominal time curve of the rotary speed or torque of the electric machine 4 during the starting process, perhaps supplemented by a measurement of these quantities and a feedback control, which ensures that the present values are maintained.

In a second step, the control device 31 determines which amplitude, frequency, and phase of the voltage or current must be provided by the invertor 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency and phase of current and voltage) and the instantaneous mean speed of the rotor.

In FIG. 2, the control device 31 is shown as being arranged outside the invertor housing 21. In order to keep the lead inductances low and also participate in the boiling bath cooling, however, it is arranged inside the invertor housing 21 in other configurations (not shown).

The control device 31 communicates various sensor serving to carry out its control tasks and sensor information derived from them to motor control unit 33 to control the engine 1. Specifically, these are, for example, the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub).

Furthermore, the control device 31 communicates with a number of other control units: an energy consumption control unit (not shown) indicates how much energy is needed for charging the vehicle battery 11, for supplying the low-voltage consumers 23 and the high-power consumers 29, 30, so that the control device 31 can provide for a corresponding overall thrust adjustment • Me (see FIG. 1c). The motor control unit 33 tells the control device 31 whether the electric machine 4 is supposed to provide acceleration or braking of the vehicle in addition to its vibration diminishing function, so that it can provide a corresponding overall thrust shift • Me and perhaps temporarily switch off the rotational nonuniformity reduction function. Accordingly, an ASR (drive slip control) control unit 34 tells the control device 31, when drive slip is present, that the electric machine 4 should temporarily act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque. The motor control unit 33 can also implement an automatic start-stop control and tell the control device 31 whether the electric machine 4 should start the engine 1.

Energy obtained during each type of braking is kept in the additional accumulator 24, to be re-used for subsequent powering of the electric machine 4 or diverted to the vehicle battery 11.

Figure 3:
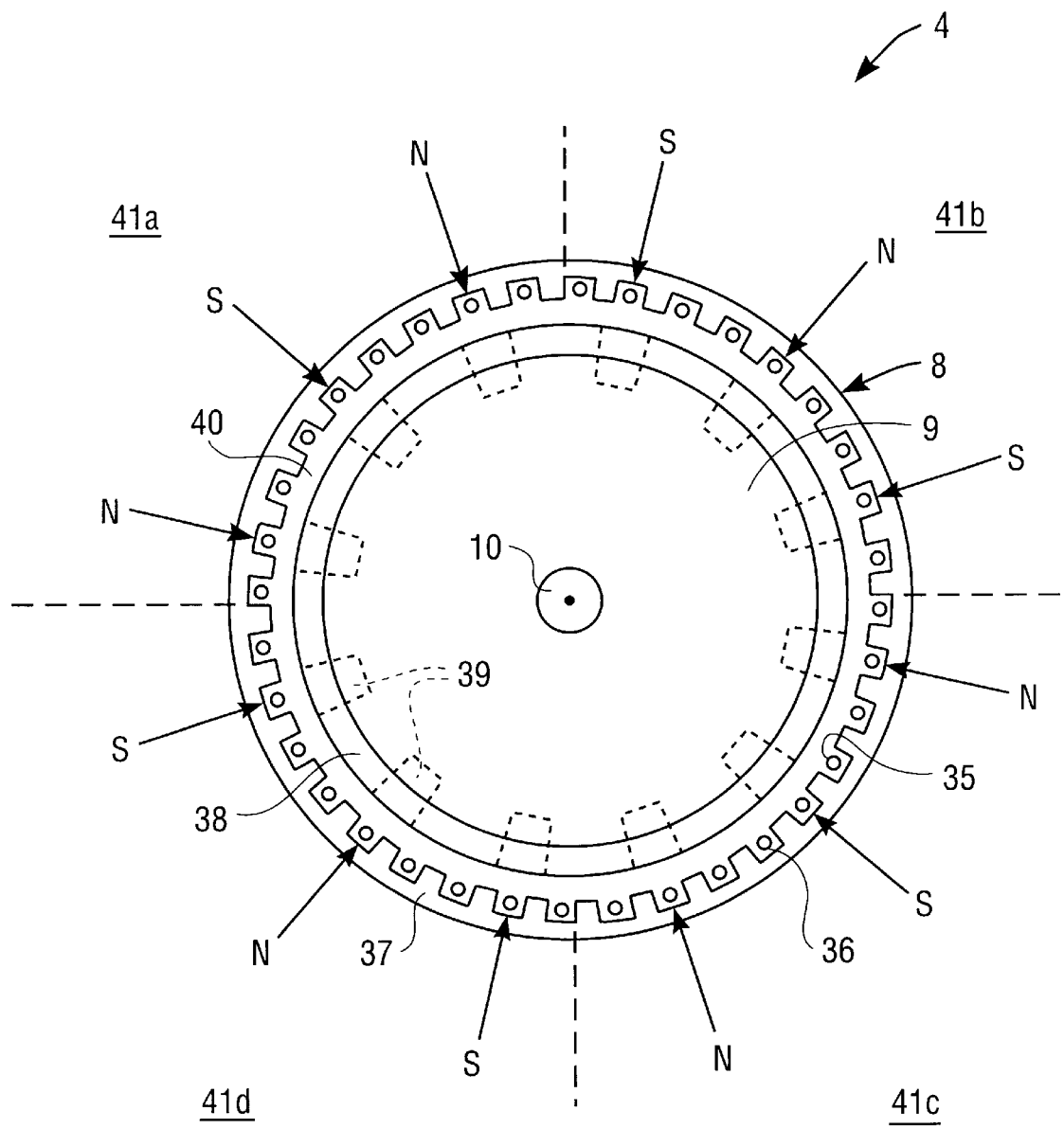
FIG. 3 a schematic cross sectional representation of an electric machine with plane of sectioning perpendicular to the axial direction in order to illustrate various machine types which can be used in the system.

The electric machine 4, shown more closely in FIG. 3, has no brushes or wiper and is thus free of wear. It has an outer diameter of around 250 mm and a length in axial direction of 55 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8, having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (In other configurations (not shown), at least six grooves per pole, preferably nine grooves, are present in order to reduce stray effects.) The poles revolve in circular motion in the stator 8 with the rotary-current oscillation. Their momentary position at a particular time is shown by arrows carrying the designations "S" (for south pole) and "N" (for north pole). A back 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 3 also shows the synchronous machine, schematically indicating its rotor pole (reference number 39).

The air gap 40 between rotor 9 and stator 8 is relatively large; its width is 0.25 to 2.5 mm, preferably 0.5 to 1.5 mm.

In other configurations (not shown), the rotor is exterior and the stator is interior.

Although FIG. 3 actually shows a rotary-field machine with a continuous 360° rotation field, it can also serve to illustrate a sector machine with several independent sectors. Without changing the stator bodies, in the sector machine there are four stator sectors 41a–41d formed in that they each carry their own self-contained three-phase stator winding, electrically independent of the others. When properly switched with four independent invertors, this allows the generation of four independent traveling waves, which can also reduce radial vibrations. In other configuration (not shown), not only the single winding, but also the stator body is confined to one or more sectors in its spatial configuration. These machines resemble one or more curved linear motors.

In other configurations (not shown), the rotor 9 is fashioned at the same time as a passive vibration absorber, being constructed from a central piece and an outer piece concentrically surrounding it, being elastically joined together, e.g., by means of an intervening layer of elastomer.

Figure 4:
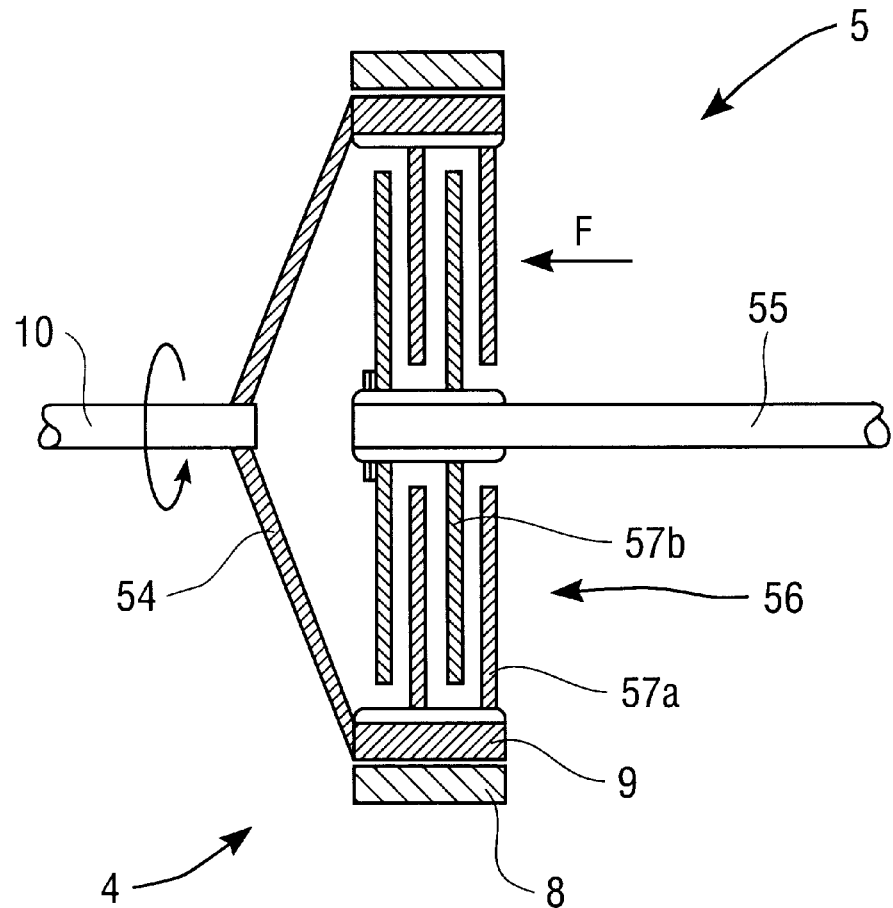
FIG. 4 a schematic cross sectional representation of an electric machine with integrated frictional coupling with plane of sectioning in the axial direction.

In the configuration per FIG. 4, the coupling 5 is integrated in the electric machine 4. Inside the stator 8, firmly mounted for example on the engine or transmission housing, the rotor 9 is firmly joined at one end by its periphery to the drive shaft 10 of the internal combustion engine 1 by means of an axially and laterally protruding cage 54. The rotor 9 is hollow on the inside and essentially has the form of a flat round cylinder. The coupling 5—here, a multidisk (multisurface frictional disk clutch) coupling functioning as a drive coupling—is arranged in the cavity. This can provide a frictional connection between the drive shaft 10 with the rotor 9 and a takeoff shaft 55 to the transmission 6, protruding into the cavity. For this, the rotor 9 has internal gearing and the takeoff shaft 55 has external gearing in the area of the cavity 55. In the space in between is arranged a set of disks 56, whose disks 57 are alternately externally and internally geared, so that one disk is frictionally joined to the rotor 9 (outer disk 57a) and the next disk is joined to the takeoff shaft 55 (inner disk 57b) in alternating manner. Without axial pressure, the outer and inner disks 57a, 57b can rotate almost freely against each other, and the shafts 10, 55 are then decoupled. If one pushes together the outer and inner disks 57a, 57b by means of a pressure device (not shown) (for example, an angled level) in the axial direction, the resulting frictional forces provide the connection between the shafts 10, 55, so that the torque generated by the engine 1 and the electric machine 4 is transmitted to the takeoff shaft 55. The frictional connection piece (i.e., the set of disks 56 here) of the clutch 5 is entirely accommodated in the rotor 9, and thus does not protrude from it sideways in the axial direction. The clutch 5 is designed as a wet clutch. The clutch oil simultaneously serves to cool the electric machine 4. In other configurations (not shown), other shiftable frictional clutches are integrated, e.g., a single-disk clutch in wet or dry design.

Other uses of the cavity inside the electric machine 4 are possible: For example, in other configurations (not shown), it accommodates the second electrical machine 27 belonging to the flywheel accumulator 26 along with the gyrating mass 28 or a mechanically engaging flywheel.

Figure 5:
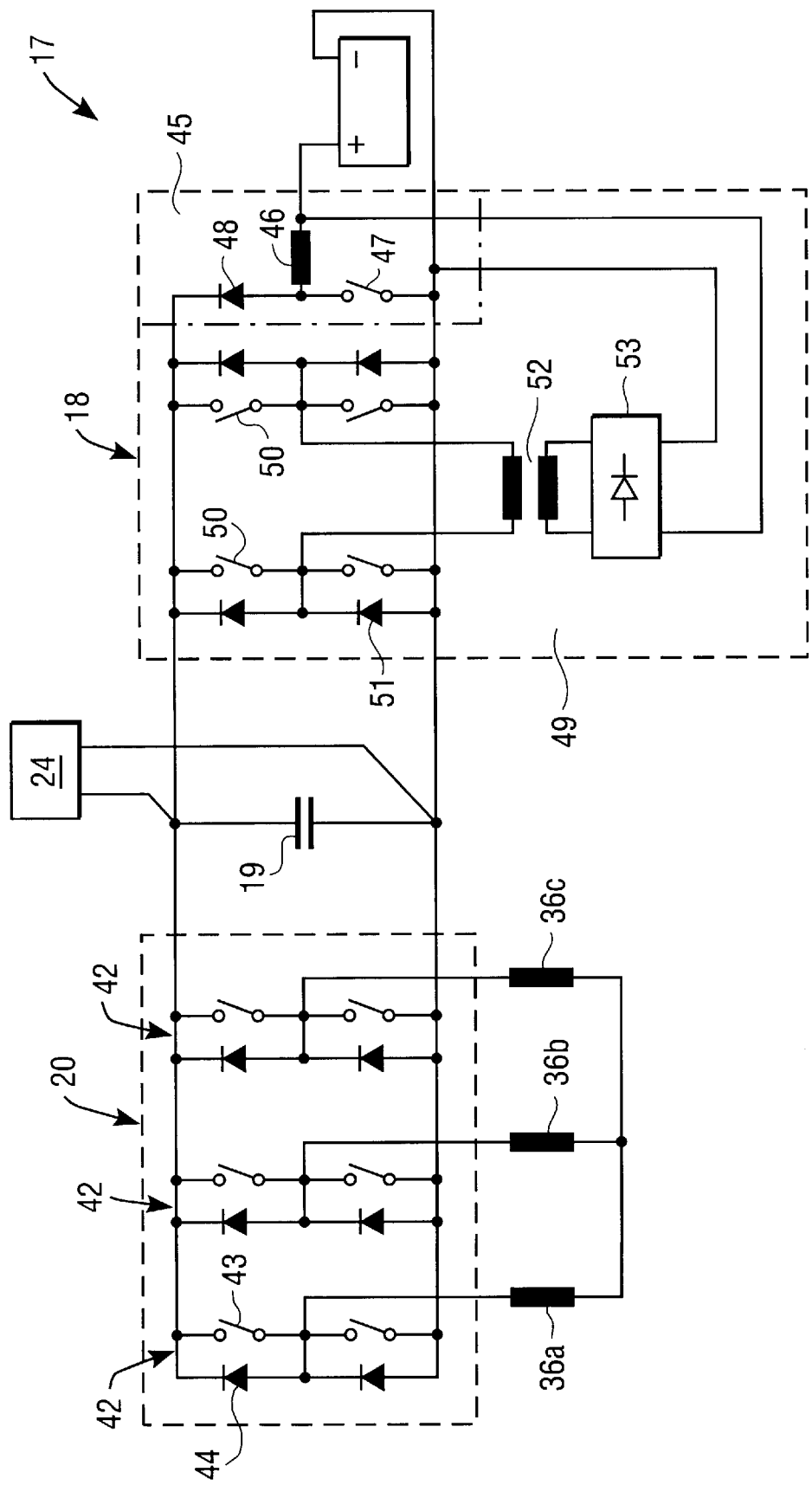
FIG. 5 a schematic circuit diagram of an invertor used in the system.

FIG. 5 shows a schematic diagram of the invertor 17. One recognizes the intermediate circuit accumulator 19 in the form of a capacitor, which is switched in parallel to the additional accumulator 24 (not shown more closely here). The capacitor symbolizes a parallel connection of several capacitors.

The machine invertor 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) by one side to one of the three windings 36a, 36b, 36c of the three-phase winding 36; at the other side, the three windings 36a, 36b, 36c are joined together.

A free-wheeling diode 44 is connected in parallel to each of the switches 43. It is polarized such that it normally blocks and only when the opposite switch is open does it let through a brief current flow in the other direction, generated by self-inductance.

Each switch 43 symbolizes a parallel connection of several (e.g., five) MOS field-effect transistors, which are directly actuated by the control device 31 to form a three-phase current of desired amplitude, frequency and phase.

The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47 is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected free-wheeling diodes 51. The ends of primary winding of a high-frequency (HF) transformer 52 are each connected to the middle of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

Figure 6:
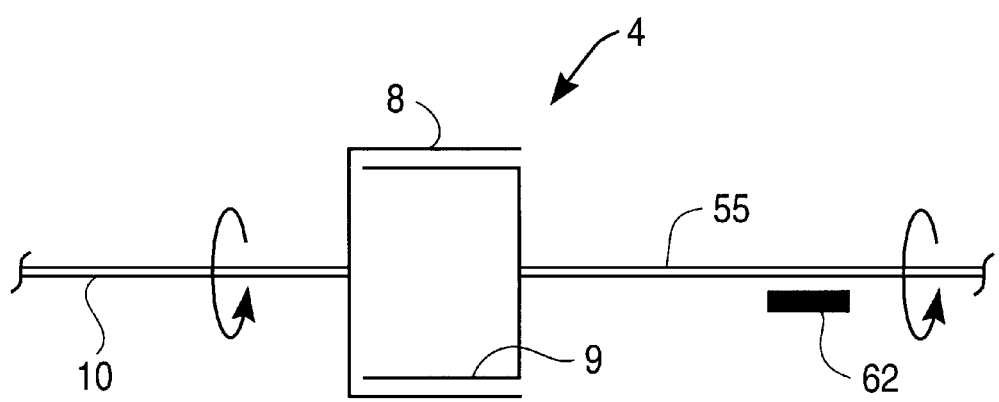
FIG. 6 a schematic representation of an electric machine with electromagnetic operating units that can rotate.

FIG. 6 shows a single electric machine 4 having the function of an electromagnetic coupling and/or synchronizing device. It has an inner and an outer electromagnetic active element, which are termed here the rotor 9 and the stator 8', borrowing the conventional terminology from electrical machines. The rotor 9 is firmly joined to the takeoff shaft 55 and the stator 8' is firmly joined to the drive shaft 10 (in other configurations—not shown—this arrangement is reversed). The electric machine 4 can thus rotate as a whole in addition to the rotor's rotation; the term "stator" should thus be taken only in a transferred sense, seeing that it can rotate. Whereas in a stationary electrical machine—such as a rotary-field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, a brake 62 which is thrust against the vehicle chassis or the transmission housing. The configuration shown has no bridge coupling, but other configurations (not shown) are outfitted with a frictional or nonpositive-locking bridge coupling for the mechanical connection of the shafts 10, 55. The machine 4 can be placed in or on the engine housing, transmission housing, or at any other place in the drive train 2.

In the function as shift coupling and possibly as starting coupling, a synchronism of the shafts 10, 55 is achieved by such an adjustment of the torque-generating magnetic fields of the machine 4 that a uniform rotary speed prevails between the shafts 10, 55, i.e., the coupling slip between stator 8' and rotor 9 precisely vanishes. In an induction machine, this is accomplished, for example, by automatic control or open-loop control of the magnetic slip of a rotary field of suitable frequency and amplitude, turning opposite the direction of the drive torque. A positive-locking bridge coupling (not shown here) eliminates the electromagnetic losses during vanishing coupling slip.

The active transmission synchronization—which can be implemented in configurations of the single machine 4 even without coupling function—is accomplished here by thrusting against the drive shaft 10 turning at the variable speed of the internal combustion engine 1. The contribution of this rotation is taken into account when determining and controlling the relative speed of the machine 4 necessary to the particular synchronization.

A reduction of rotational nonuniformities of the drive shaft 10 can occur with the vehicle at standstill, thrusting against the rotor 9 which is then prevented from turning by means of the brake 62. When moving under power, rotational nonuniformities of the takeoff shaft 55 can be reduced by rapid variation of the transmitted torque with the bridge coupling not engaged (or not present), specifically, by reducing [this torque] (i.e., increasing the clutch slip) for positive rotational nonuniformity and increasing [this torque] (i.e., decreasing the clutch slip) for negative nonuniformity.

Additional acceleration or braking is possible with the bridge clutch not engaged by generating appropriate torques—or in other words—less or more clutch slip. The electric machine 4 can be involved in an ASR control such that when the drive wheel slip is too large the clutch slip is momentarily increased and thus the moment applied to the drive wheels is reduced. A generator function to produce current is achieved by permanently maintaining clutch slip.

The electric machine 4 can start the internal combustion engine 1 directly, by thrusting against the takeoff shaft 55 fixed by the brake 62. In another configuration, when the machine 4 does not provide sufficient torque for this, it can serve as a nonwearing flywheel starter, making use of the electromagnetic coupling function. For this, the electric machine 4 first accelerates, with gear disengaged and brake 62 released, the then free-wheeling rotor 9, along with the takeoff shaft 55, propped against the drive shaft 10 and the compression of the still idle engine 1, up to a relatively high rotational speed, e.g., 2000 rpm. The electric machine 4 is then reversed in a brief time such that it produces a braking moment, i.e., frictional connection between the rotor and the stator 8'. In this way, the rotor 9 with the takeoff shaft 55 and the stator 8' with the drive shaft 10 are quickly brought to a common mean speed (e.g., 800 rpm) and the engine 1 is started.

What is claimed is:

1. System for active dampening of rotational nonuniformities of a crankshaft (10) of an internal combustion engine (1) or a shaft coupled to it, with an electric rotary-field machine (4), which applies alternating torques to the crankshaft (10) or the shaft, so that it counteracts positive and negative rotational nonuniformities, at least one invertor (17), which generate at least one electrical characteristic including voltages and currents, the electrical characteristic having at least one variable including frequency, amplitude and phase required for the magnetic fields of the electric machine (4) by sine-evaluated pulse modulation with a clock frequency greater than 10 kHz;

wherein the invertor (17) has an intermediate circuit with higher voltage level than an on-board network;

and wherein the invertor (17) is outfitted in the intermediate circuit with an energy accumulator (19, 24) for buffering of energy accruing during the active dampening;

wherein both the removal of energy from the intermediate circuit during motor operation of the electric machine (4) and the feeding of energy into the intermediate circuit in generator mode each occur at the elevated voltage level.

2. System per claim 1, in which the electric machine (4) superimposes a positive or negative torque on the alternating torques for dampening of rotational nonuniformities in order to further achieve a driving action or a braking or generator-type action.

3. System per claim 1 in which the energy accumulator (24) is a flywheel accumulator.

4. System according to claim 1, in which the electric machine (4) also has the function of a starter.

5. System according to claim 1, in which the electric machine (4) also has the function of a generator for power supply.

6. System according to claim 1, in which the electric machine (4) can bring about or sustain at least one of an acceleration and braking of the crankshaft (10) or the shaft, in order to accomplish at least one of accelerating or braking a vehicle and reducing the slip of a drive wheel by braking in the context of an antislip control.

7. System according to claim 1 in which an auxiliary machine is electrically powered at a high voltage level from the intermediate circuit.

8. System according to claim 7 wherein the auxiliary machine is selected from the group consisting of an air conditioner (29), a servo-drive (30), and a pump.

9. System according to claim 1 in which the reduction of rotational nonuniformities is done by at least one of automatic control, and open-loop control.

10. System per claim 8, in which at least one of the gas pressure and the momentary torque of the engine (1) serves as a control quantity for the reduction of rotational nonuniformities.

11. System according to claim 8 wherein the open-loop is at least one of characteristic diagram control, and adaptive control.

12. System according to claim 1, in which the electric rotary-field machine (4) is an induction machine, a synchronous machine, or a reluctance machine.

13. System according to claim 1, in which the control of the electric machine (4) is based on a field-oriented automatic control (vector control).

14. System according to claim 1 in which the electric machine (4) has a fine pole division.

15. System according to claim 14 wherein the fine pole division is at least one pole (39) per 45° stator angle.

16. System according to claim 1 in which the electric machine (4) has a high maximum pole reversal frequency.

17. System according to claim 16 wherein the high maximum pole reversal frequency is between 300 Hz and 1600 Hz.

18. System according to claim 1 in which the stator (8) of the electric machine (4) has selected ones of thin stator plates and stator plates that are made from a material with low remagnetization losses.

19. System according to claim 18 wherein each stator plate has a thickness of 0.35 mm or less.

20. System according to claim 18 wherein the low remagnetization losses are less than 1 Watt/kilogram at 50 Hz and one Tesla.

21. System according to claim 1 in which the electric machine (4) has an internal fluid cooling, wherein the supply of cooling fluid is dependent on the loss of at least one of power and rotary speed.

22. System according to claim 21 wherein the internal fluid cooling is a spray fluid cooling.

23. System according to claim 1 in which the electric machine (4) has a high torque density.

24. System according to claim 23 wherein the high torque density is greater than 0.01 Nm/cm.

25. System according to claim 1 in which the electric machine (4) works far into the magnetic saturation region.

26. System according to claim 25 wherein the magnetic saturation region is at a current coverage (or maximum torque) of at least 400 to 1000 A/cm air gap in the circumferential direction.

27. System according to claim 1 in which electronic switches (43, 47, 50) of the invertor (17) are fluid-cooled.

28. System according to claim 17 wherein the switches are boiling bath cooled.

29. System according to claim 1 in which several electronic switches (43) of the invertor (17) are connected in parallel.

30. System according to claim 1 in which the invertor (17) contains, as switches (43, 47, 50), semiconductor switches.

31. System according to claim 30 wherein semiconductor switches are selected from the group consisting of field effect transistors, bipolar transistors, and bipolar transistors with insulated gate (IGBTs).

32. System according to claim 1 in which a coupling, especially a drive coupling (5), is integrated in the electric machine (4).

33. System according to claim 32 wherein the drive coupling is integrated in a rotor (9) of the electric machine.

34. System according to claim 1, in which the electric machine (17) or the crankshaft/shaft is outfitted with a rotor position or shaft position pickup with a precision of at least 0.5 degrees.

* * * * *